(12) United States Patent
Fujita et al.

(10) Patent No.: US 7,706,452 B2
(45) Date of Patent: Apr. 27, 2010

(54) RECEPTION DEVICE, TRANSMISSION DEVICE, AND RADIO SYSTEM

(75) Inventors: Suguru Fujita, Tokyo (JP); Kazuaki Takahashi, Tokyo (JP); Masahiro Mimura, Tokyo (JP)

(73) Assignee: Panasonic Corporation, Osaka (JP)

( * ) Notice: Subject to any disclaimer, the term of this patent is extended or adjusted under 35 U.S.C. 154(b) by 712 days.

(21) Appl. No.: 10/599,378

(22) PCT Filed: Mar. 15, 2005

(86) PCT No.: PCT/JP2005/004496

§ 371 (c)(1),
(2), (4) Date: Sep. 27, 2006

(87) PCT Pub. No.: WO2005/104379

PCT Pub. Date: Nov. 3, 2005

(65) Prior Publication Data

US 2008/0232506 A1    Sep. 25, 2008

(30) Foreign Application Priority Data

Apr. 20, 2004  (JP)  ............................. 2004-123966
Mar. 3, 2005   (JP)  ............................. 2005-058566

(51) Int. Cl.
    *H04L 27/00*    (2006.01)
(52) U.S. Cl. ..................... 375/259; 375/295; 375/316
(58) Field of Classification Search ......... 375/259–260, 375/295, 316
    See application file for complete search history.

(56) References Cited

U.S. PATENT DOCUMENTS

| 2,091,271 | A | * | 8/1937 | Conklin | ..................... 455/214 |
| 4,144,533 | A | * | 3/1979 | Van Hijfte et al. | ............. 342/92 |
| 4,259,650 | A | * | 3/1981 | Donahue | ..................... 333/166 |
| 6,452,530 | B2 | | 9/2002 | Joe et al. | |
| 6,810,087 | B2 | * | 10/2004 | Hoctor et al. | ............... 375/259 |
| 6,989,782 | B2 | * | 1/2006 | Walker et al. | ............... 342/134 |
| 7,391,251 | B1 | * | 6/2008 | Zhang et al. | ................ 327/261 |
| 2003/0058971 | A1 | * | 3/2003 | Langford et al. | ............ 375/343 |
| 2005/0179585 | A1 | * | 8/2005 | Walker et al. | ............... 342/134 |

FOREIGN PATENT DOCUMENTS

| CN | 1441558 A   | 9/2003 |
| JP | 7-327055    | 12/1995 |
| JP | 10-190356   | 7/1998 |
| JP | 2003-60618  | 2/2003 |
| JP | 2003-513501 | 4/2003 |

* cited by examiner

*Primary Examiner*—Jean B Corrielus
(74) *Attorney, Agent, or Firm*—Pearne & Gordon LLP

(57) ABSTRACT

A transmitter using a plurality of pulse signals having different pulse sequence times, a receiver for steadily demodulating pulse signals of only desirable wave, and a wireless system are disclosed. In the transmitter, a control signal generating circuit outputs a control signal for generating a plurality of pulse signals having different pulse sequence generating times, a pulse generating circuit generates a plurality of pulse signals by using the control signal. In the receiver, reception front end receives the plurality of pulse signals having different pulse sequence generating times, delay circuit delays at least one of reception front-end output signals supplied from the reception front-end by a given time, delay pulse composition circuit combines delay signal with reception front-end output signal, so that the receiver steadily demodulates the pulse signals of only the desirable wave.

13 Claims, 16 Drawing Sheets

RECEPTION DEVICE, TRANSMISSION DEVICE, AND RADIO SYSTEM

This application is a U.S. National Stage Phase application of PCT International Application No. PCT/JP2005/004496, filed Mar. 15, 2005.

TECHNICAL FIELD

The present invention relates to receivers, transmitters and wireless communication systems using pulse signals of which wavelength ranges from millimeter wave band to microwave band.

BACKGROUND ART

Recently, communication systems using the frequency band ranging from several hundreds MHz to several GHz or an extra higher and wider frequency band, i.e. ultra wide band (UWB), has been gaining in popularity, and distance measuring systems using the signals of UWB have been studied progressively.

The ultra wide band communication differs from conventional wireless communications in using narrow pulses (sometimes referred to as short pulses) and spreading frequency components in the frequency bands ranging from several hundreds MHz to several GHz or an extra higher and wider frequency band for communication. The distance measuring system using the UWB communication calculates a distance by measuring a time difference between a short pulse signal transmitted and the short pulse signal received. It is necessary to control pulses having extremely narrow width, such as not greater than 1 nanosecond, for a high-speed communication using UWB or measuring a distance accurately, yet it has been difficult to carry out this control. The recent progress in semiconductor technology, however, allows carrying out this control. Advantages of the UWB communication are these: Use of short pulses allows many users to use signals of frequencies common to the users because the signals scarcely overlap each other per unit time, so that respective communications can be separated with ease and the communications can be done in a concurrent manner. The UWB communication also spreads frequency components over an extremely wide frequency band, so that the communication hardly invites noises or radio-wave interference caused by a specific frequency.

One of pulse generating circuits of conventional transmitters is disclosed in Japanese Translation of PCT Publication No. 2003-513501, and one of conventional receivers can employ the demodulating circuit disclosed in U.S. Pat. No. 6,452,530 or a signal modulation circuit, which improves an S/N ratio, disclosed in Unexamined Japanese Patent Publication No. H10-190356.

FIG. 14 shows the pulse generating circuit of the conventional transmitter disclosed in Japanese Translation of PCT Publication No. 2003-513501. In FIG. 14, the pulse generating circuit of the conventional transmitter comprises the following elements:

analog waveform generating circuit 801 which generates any signal of analog waveform;

inductor 802; and circuit 803 formed of negative resistance elements having a stable region and an unstable region.

The analog waveform signal including transmission data is generated by analog waveform generating circuit 801, and then fed into inductor 802, which converts the waveform of the signal. The signal having undergone the waveform conversion is then fed into circuit 803 formed of the negative resistance elements. Circuit 803 changes its operating status in the stable region and the unstable region in response to the analog waveform signal having undergone the waveform conversion, so that circuit 803 oscillates in the unstable region. Inductor 802 converts the waveform of the signal so that circuit 803 can oscillate in the unstable region. The oscillation in the unstable region allows dividing one pulse of the signal into plural short pulses, so that a transmission output signal is obtainable.

FIG. 15 shows the pulse signal demodulating circuit of the conventional receiver disclosed in U.S. Pat. No. 6,452,530. In FIG. 15, the pulse demodulating circuit comprises the following elements:

receiving unit 901 for converting pulse signals received from antenna 904 into analog signals;

reception pulse generating circuits 902 having different pulse generating standards from each other; and composition determining circuit 903 for generating a reception data signals by arranging the pulse signals generated by respective pulse generating circuits 902.

The pulse signal demodulating circuit converts the received pulse signals into analog signals at receiving unit 901, and the converted analog signals are fed into reception pulse generating circuits 902 having different pulse generating standards from each other. Composition determining circuit 903 arranges the pulse signals generated by the respective pulse generating circuits 902 for generating a reception data signals.

FIG. 16 shows the signal demodulating circuit which can improve the S/N ratio of the conventional receiver disclosed in Unexamined Japanese Patent Publication No. H10-190356. In FIG. 16, delay circuit 1001 produces a delay time of $\tau f = n\tau c$, where $\tau f$ indicates delay time "$\tau$" (second) and $\tau c$ indicates iterative cycle ($n = 0, 1, 2, \ldots$) of the modulated frequency when the signal is FM modulated. Adaptation of the delay detection to the demodulation of FM modulated wave allows composite circuit 1002 to add up modulated signals, i.e. repetitive waves, and not to add up noise components, i.e. non-correlative waves. This mechanism increases the ratio of desirable wave vs. noise components, so that the S/N ratio can be improved.

Although this is not described with an example, use of a different spread-code for respective users in the spread spectrum communication allows overlapping plural users' signals in one frequency band (CDMA: code division multiple access). This CDMA is employed in the mobile communication.

When both of a mobile station near a base station and another mobile station distant from the base station communicate with the base station simultaneously, the radio wave from the nearby mobile station attenuates only a little because of a short distance from the base station, so that the radio wave arrives at the base station as a large signal. On the other hand, the radio wave from the distant mobile station attenuates by a greater amount because of a long distance from the base station, so that the radio wave arrives at the base station as a small signal. In this case, the base station adjusts the power level of the receiving system in accordance with the large signal transmitted from the nearby mobile station, so that the small signal transmitted from the distant mobile station cannot be demodulated, i.e. a distance problem occurs. To overcome this distance problem, the transmission power of the nearby mobile station is lowered, which is known as a method of transmission power control. This method allows the mobile station to control the transmission power based on the control information supplied from the base station, so that the difference in signal powers of the radio waves transmitted from the nearby mobile station and the distant mobile station can be reduced. As a result, both of the signals can be adjusted to be received and demodulated in terms of the power level of the receiving system.

When the conventional transmitter and receiver disclosed respectively in Japanese Translation of PCT Publication No. 2003-513501 and U.S. Pat. No. 6,452,530 receive radio-wave from a distant wireless device and another radio-wave from a nearby wireless device (a wireless device is used as a generic term of a transmitter and a receiver) simultaneously, the reception power level is controlled in response to the signal of greater power due to the distance problem discussed above, so that the signal of smaller power sometimes cannot be received or demodulated. On top of that, those signals sometimes interfere with each other, so that the signals can be processed erroneously.

The technique of improving the S/N ratio of the conventional receiver disclosed in Unexamined Japanese Patent Publication No. H10-190356 utilizes the phenomenon that signals of regularity can be superimposed, and signals of non-regularity cannot be superimposed, so that signals of regularity supplied from plural wireless devices can be hard to be separated. The technique of transmission power control is effective in the communication between one station and multi-stations, so that when plural wireless links are available, a complicated wireless control across the links is needed. For instance, assume that wireless devices communicate with each other at long range, and other wireless devices communicate with each other at short range, then it is difficult to lower the transmission power of the wireless devices involved in the long range communication because the power level is adjusted in accordance with the receiving level of the wireless devices involved in the short range communication.

On top of that, use of the time-division multiplexing, frequency-division multiplexing or code-division multiplexing as a communication method can make the wireless device complicated, upsized and expensive.

DISCLOSURE OF INVENTION

The present invention provides a transmitter employing plural pulse signals having different pulse sequence generating times, a receiver suitable for mass-production and for demodulating, in a stable manner, pulse signals of only desirable wave out of the plural pulse signals having the different pulse sequence generating times and being transmitted from the transmitter, and also a wireless system. The present invention provides the foregoing transmitter, receiver and wireless system in compact sizes and at inexpensive costs.

The receiver of the present invention includes a reception front-end, a delay circuit, and a delay-pulse composition circuit. The reception front-end receives plural pulse signals having different pulse-sequence generating times as reception signals. The delay circuit delays at least one signal supplied from the reception front-end by a given time different from a delay time of another signal, thereby producing a delay signal. The delay pulse composition circuit combines a first delay signal and a second delay signal or a signal supplied from the reception front end.

The foregoing structure allows obtaining a downsized and inexpensive receiver which, e.g. cancels out the pulse signals, i.e. interference waves, each other, and demodulates the pulse signals of only desirable waves in a stable manner. The present invention saves the receiver filters for different frequency bands or a filter for variable frequencies needed in the frequency-division multiplexing communication, so that the receiver is suitable for mass production. For instance, in the case of frequency-division multiplexing communication, a special circuit is required for selectively picking up signals of any frequency out of the multiplexed signals. The foregoing special circuit includes filters and receiving branches for plural frequency bands, or a variable frequency filter which is adaptable to the plural frequency bands. However, the present invention can save the receiver these circuits, so that the receiver is suitable for mass production.

The transmitter of the present invention includes a control signal generating circuit and a pulse generating circuit. The control signal generating circuit outputs a control signal in order to generate plural pulse signals having different pulse sequence generating times. The pulse generating circuit generates plural pulse signals by using the control signal. This structure allows obtaining the transmitter which can transmit signals simultaneously to plural receivers by using plural pulse signals having different pulse sequence generating times.

Figure 1A:
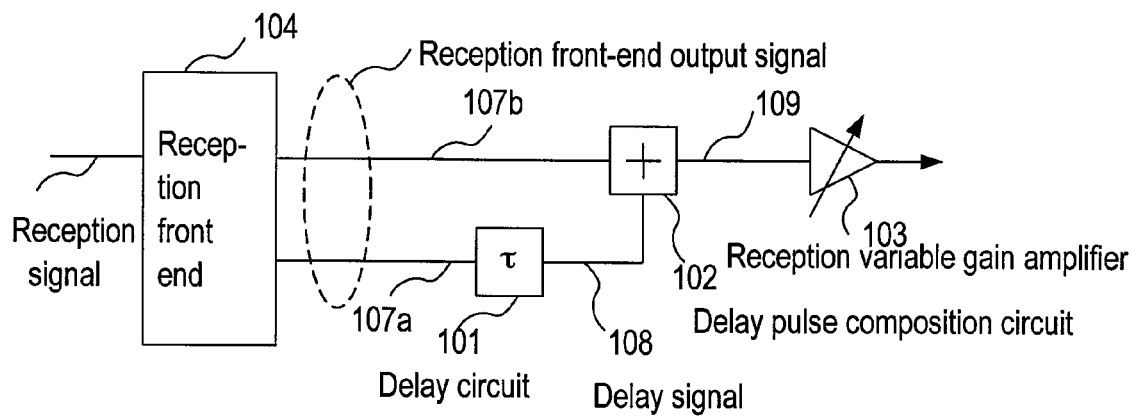
FIG. 1A shows a block diagram illustrating a structure of a receiver in accordance with a first embodiment of the present invention.

DESCRIPTION OF REFERENCE MARKS 11, 1501 short pulse signal
12, 1503 long pulse signal
101, 1103 delay circuit
102, 1104, 1604a, 1604b delay pulse composition circuit
103 reception variable gain amplifier
107, 306, 501, 1607a, 1607b, 1607c, 1607d output signal from reception front-end
108, 307, 502, 1608a, 1608b delay signal
109, 308, 503 composite output signal
201 switchover signal generating circuit
202 control signal generating circuit
203 waveform converting circuit
204 oscillating circuit
301 first antenna
302 second antenna
303, 1105, 1605 reception demodulating circuit
401, 1101a, 1101b, 1601 antenna
402, 1102, 1602, distributing circuit
403 passage loss of distributing circuit 402 on the side of delay pulse composition circuit 102
404 passage loss of distributing circuit 402 on the side of delay circuit 101
405 branch-line coupler
406 terminating resistor
407 capacitor
408 variable capacitor
409 element
410-417 terminal
601 home server
602 TV
603 audio player
604 wall
605 PC (personal computer)
701, 702, 703 mobile station
704 wide and short area for distance measuring
705 narrow and long area for distance measuring
1106 pulse sequence time setting circuit
1107 pulse generating circuit
1201 signal from TV
1202 signal from audio player
1301, 1303, 1305 desirable wave
1302, 1304, 1306 interference wave
1401 signal from home server
1402 signal from PC
1502 rather long pulse signal
1603a first delay circuit
1603b second delay circuit

DESCRIPTION OF PREFERRED EMBODIMENTS

Exemplary embodiments of the present invention are demonstrated hereinafter with reference to the accompanying drawings.

Embodiment 1

FIG. 1A shows a block diagram illustrating a structure of a receiver in accordance with the first embodiment of the present invention. The receiver shown in FIG. 1A includes reception front end 104, delay circuit 101, delay pulse composition circuit 102, and reception variable gain amplifier 103. Reception front end 104 receives plural pulse signals having different pulse sequence generating times as reception signals. Delay circuit 101 delays signal 107a supplied from reception front-end 104, and outputs delay signal 108. Delay pulse composition circuit 102 combines signal 107b supplied from reception front end 104 and delay signal 108. Reception variable gain amplifier 103 amplifies an output from delay pulse composition circuit 102.

The operation of the foregoing receiver is demonstrated hereinafter. When reception front end 104 receives a reception signal formed of plural pulse signals, reception front end 104 outputs reception front-end output signal 107a to delay circuit 101, and also outputs reception front-end output signal 107b to delay pulse composition circuit 102. Delay circuit 101 produces delay time of τ (second), and when circuit 101 receives reception front-end output signal 107a, it outputs delay signal 108. Delay pulse composition circuit 102 combines delay signal 108 and reception front-end output signal 107b, then outputs composite output signal 109. Reception variable gain amplifier 103 amplifies signal 109.

Figure 1B:
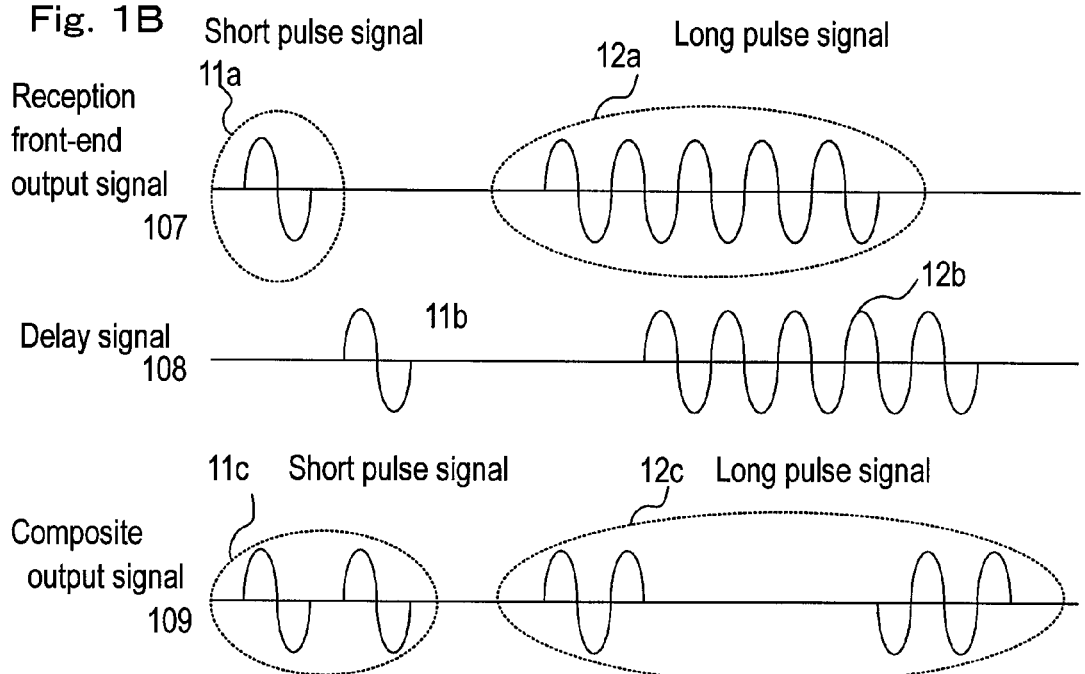
FIG. 1B shows composition of pulse signals in the receiver in accordance with the first embodiment of the present invention.

FIG. 1B shows the combining of a reception front-end output signal and a delay signal in accordance with this first embodiment. Short pulse signal 11 works as a desirable signal, and long pulse signal 12 works as an interference signal. Short pulse signals 11 and long pulse signals 12 are mixed in the reception signals. In such reception signals, long pulse signals 12, which work as interference signals, have a large amount of integral electric power due to a long pulse sequence time, so that reception variable gain amplifier 103 can be saturated with interference signals, or amplifier 103 carries out gain control with the electric power of the interference signals included. As a result, short pulse signal 11 working as a desirable signal cannot be demodulated. The receiver synchronizes and demodulates not only short pulse signals 11 but also long pulse signals 12, so that a signal processing time is sometimes prolonged and the signals can be erroneously processed.

To overcome the foregoing problems, the receiver of the present invention produces delay signal 108, which includes a delay time, at delay circuit 101. To be more specific, reception front end 104 receives a reception signal, and outputs reception front-end output signals 107a and 107b. Delay circuit 101 delays signal 107a by delay time τ and outputs delay signal 108, which thus delays from reception front-end output signal 107b by delay time τ.

Delay circuit 101 sets the delay time τ to be greater than the time occupied by short pulse signals 11, so that composite output signal 109 supplied from delay pulse composition circuit 102 includes two short pulse signals (refer to reference mark 11c in FIG. 1B) although long pulse signals are canceled out in part (refer to 12c in FIG. 1B). The pulse signal of the long pulse signals canceled out in part becomes smaller in amplitude, so that integral electric power of long pulse signals 12c decreases substantially from that of long pulse signals 12a. Reception variable gain amplifier 103 can thus operate appropriately to the desirable signals, and can demodulate the short pulse signals.

In the case of delay time τ being, e.g. an odd multiple of a half cycle of long pulse signal 12a, delay pulse composition circuit 102 combines the pulse signals of interference waves at 180 degrees phase difference, so that long pulse signals 12c in composite output signals 109 are canceled out in the greatest amount. As a result, the integral electric power can be much more reduced. Even if delay time τ spans ranging from "n-(2/3)" cycle to "n-(1/3)" cycle of long pulse signal 12a (n: natural number), the signals can be canceled out, and the integral electric power can be reduced.

As discussed above, the receiver of the present invention with a simple structure cancels the pulse signals each other out, which pulse signals work as interference signals, and demodulates the pulse signals of only desirable signals in a stable manner. Since a conventional receiver needs the time-division multiplexing, frequency-division multiplexing or code-division multiplexing, the conventional receiver is obliged to be upsized and high-priced. However, the present invention saves the receiver the time-division multiplexing or the like, so that the receiver is free from upsizing or high-pricing, and yet, it is suitable for mass production.

In the foregoing description, the reception signals include two types of signals, namely, a signal having a long pulse sequence time and a signal having a short pulse sequence time; however, the present invention is applicable to three or more than three types of signals, e.g. a short pulse signal, a semi-long pulse signal, and a long pulse signal are supplied from reception front-end 104 as the reception front-end output signals. In such a case, delay circuits having different delay times in response to the respective reception front-end output signals are provided, so that an advantage similar to what is discussed previously can be expected. To be more specific, when the reception front end outputs three kinds of reception front-end output signals, one-three delay circuits can be provided.

In the foregoing embodiment, adverse effect of the interference signal to the reception amplifier is described. The interference signal similarly affects, e.g. receiving mixers or receiving IF amplifiers, and the structure discussed in this embodiment also reduces these adverse effects and demodulates desirable signals in a stable manner advantageously.

Figure 2A:
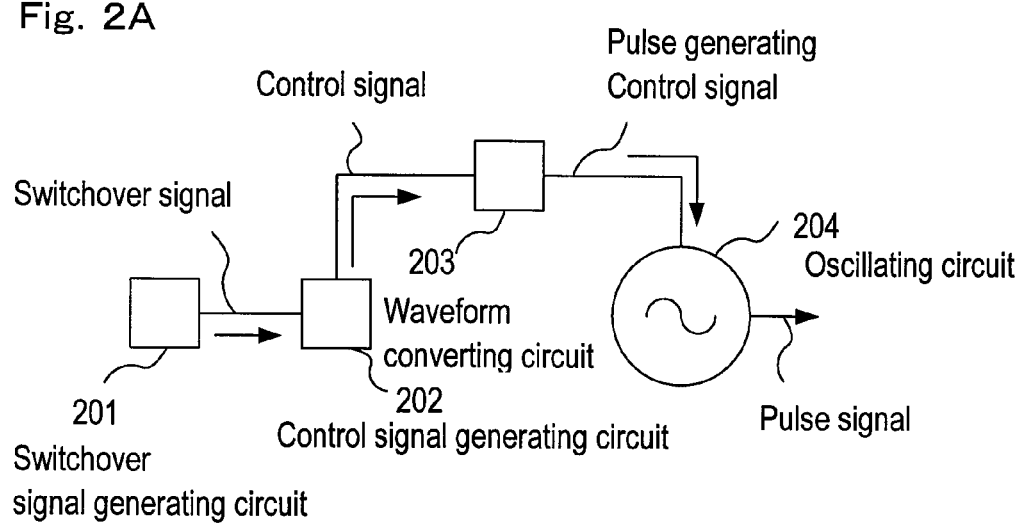
FIG. 2A shows a block diagram illustrating a structure of a pulse generating circuit of a transmitter in accordance with the first embodiment of the present invention.

FIG. 2A shows a block diagram illustrating a structure of a pulse generating circuit of a transmitter in accordance with the first embodiment of the present invention. In FIG. 2A, the transmitter in accordance with the first embodiment includes the following elements:

switchover signal generating circuit 201;

control signal generating circuit 202;

waveform converting circuit 203; and oscillating circuit 204.

Switchover signal generating circuit 201 generates switchover signals, which prompts control signal generating circuit 202 to generate control signals. Waveform converting circuit 203 converts a waveform by using the control signal generated by control signal generating circuit 202. Oscillating circuit 204 oscillates pulses by using pulse generating control signals supplied from waveform converting circuit 203.

The operation of the pulse generating circuit of the foregoing transmitter is demonstrated with reference to FIG. 2A. Assume that one cycle of a sic-function corresponds to one pulse, then switchover signal generating circuit 201 outputs a pulse signal which generates only one pulse as a pulse signal having a short pulse generating time, or circuit 201 outputs a switchover signal which generates several tens of pulses in sequence as pulse signals having a long pulse generating time. Circuit 201 can switch the output from one of these two kinds of signals to the other one or vice versa. To be more specific, when circuit 201 outputs "0" as a switchover signal, control signal generating circuit 202 generates a control signal which outputs pulse signals for only 0.1 ns (nanosecond). When circuit 201 outputs "1" as a switchover signal, control signal generating circuit 202 generates a control signal which outputs pulse signals for 1 ns. The present invention, not to mention, does not limit the time span of generating control signals to 0.1 ns or 1 ns. Based on the switchover signal supplied from circuit 201, control signal generating circuit 202 outputs a control signal in response to the respective pulse generating times to waveform converting circuit 203, which then converts the control signal to a pulse-generating control signal appropriately to the operation of oscillating circuit 204.

Waveform converting circuit 203 is formed of coils, resistors and operational amplifiers, or an IC containing the foregoing elements. Circuit 203 adjusts the rising characteristics or falling characteristics of a control signal depending on the inductor value of the coils, and also adjusts the amplitude or DC offset value of the control signal by using plural resistors and operational amplifiers. The pulse generating control signal generated by circuit 203 prompts oscillating circuit 204 to generate pulse signals as a voltage to be applied to the power supply terminals of oscillating circuit 204. This is done by controlling respective time spans of oscillation and halt of oscillating circuit 204.

This embodiment employs oscillating circuit 204 as the pulse generating circuit; however, any circuit that can generate pulse signals can be used as the pulse generating circuit. The structure of oscillating circuit 204 is not limited to the structure described in this embodiment. The pulse generating time can be also switched by generating either one of pulse signals having short generating time or long generating time in a given quantity for an every given period. This method allows generating pulse signals having short pulse-generating time or long pulse-generating time.

Figure 2B:
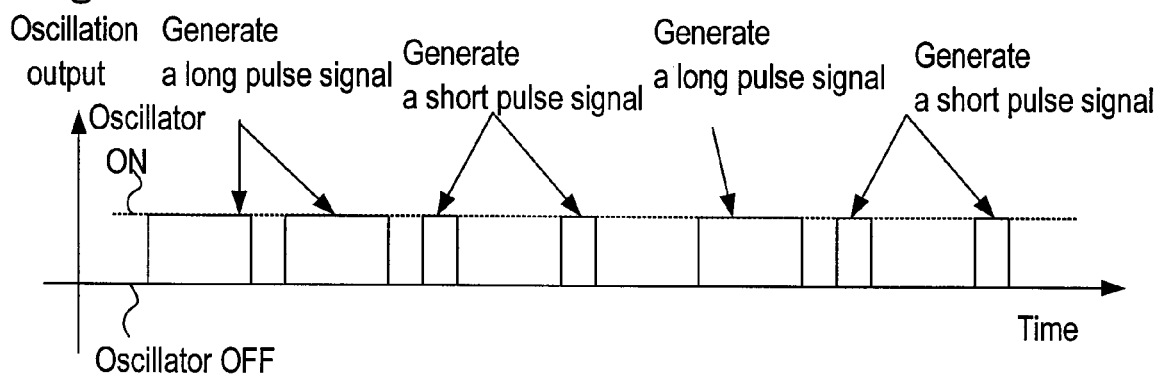
FIG. 2B shows a switchover of a pulse generating time in the pulse generating circuit of the transmitter in accordance with the first embodiment of the present invention.

FIG. 2B shows switchovers of pulse-generating times in oscillating circuit 204 in response to the control signal supplied from switchover signal generating circuit 201. This is done in the pulse generating circuit of the transmitter in accordance with this first embodiment. The present invention can generate the pulse signals having short pulse-generating times and the pulse signals having long pulse-generating times mixed together in a given quantity for an every given time.

The present invention describes two pulse signal generating times, namely, 0.1 ns and 1 ns; however, the present invention is not limited to these two numbers, but the present invention produces an advantage similar to what is discussed above when another combination of pulse signal generating times. Switchover signal generating circuit 201 sets a number of pulses in response to the pulse generating time, whereby the number of pulses to be generated can be determined respectively for the long pulse signal and the short pulse signal. For instance, when switchover signal generating circuit 201 outputs "0" as a switchover signal, control signal generating circuit 202 generates a control signal which outputs pulse signals for 0.5 ns, and when "1" is output from circuit 201, control signal generating circuit 202 generates a control signal which outputs pulse signals for 1.5 ns. This mechanism allows the transmitter of the present invention to adjust arbitrarily the number of pulses to be generated in response to the pulse generating time.

Use of three or more than three types of quantity of pulses to be generated allows the present invention to produce a similar advantage to what is discussed above. To be more specific, the commands of respective switchover signals supplied from switchover signal generating circuit 201 are shown on a table (not shown), and circuit 201 stores the table in advance. For instance, in the case of a transmission signal formed of pulse signals having three types of pulse generating times, control signal generating circuit 202 generates the number of pulse signals in response to the following respective pulse-generating times:

"01" is supplied from circuit 201 as a switchover signal: 0.5 ns,

"10" is supplied from circuit 201 as a switchover signal: 1 ns,

"11" is supplied from circuit 201 as a switchover signal: 2 ns, and

"00" is supplied from circuit 201 as a switchover signal: no pulse signal is generated.

As discussed above, the number of pulses to be generated in response to the pulse generating time can be arbitrarily set, and the transmission signal formed of pulse signals having three types of pulse generating times can be produced.

Representation of the commands of respective switchover signals on the table allows producing the transmission signal formed of pulse signals having four or more than four types of pulse generating times. The present invention is not limited to the pulse generating times such as 0.5 ns, 1 ns, 2 ns shown in this embodiment.

Embodiment 2

Figure 3A:
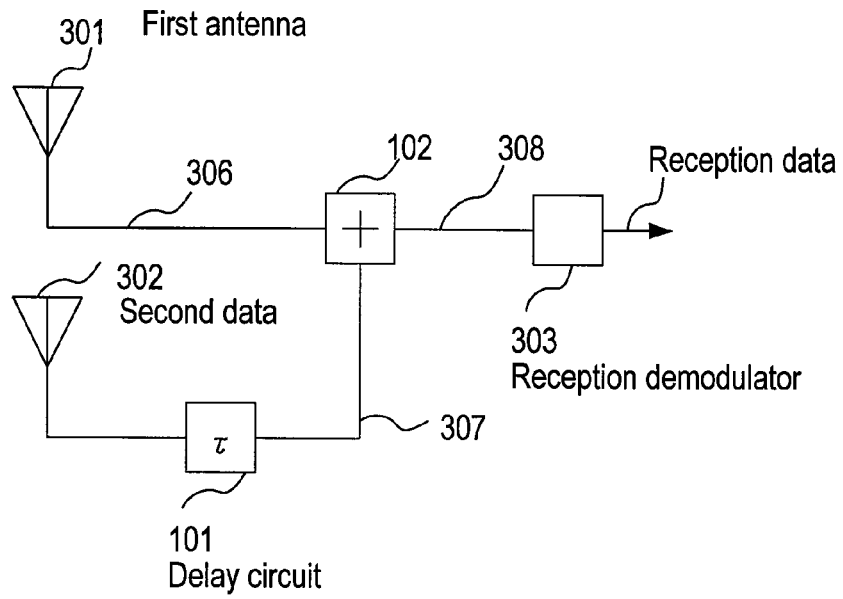
FIG. 3A shows a block diagram illustrating a receiver in accordance with a second embodiment of the present invention.

FIG. 3A shows a block diagram illustrating a receiver in accordance with the second embodiment of the present invention. The second embodiment differs from the first embodiment in forming the reception front-end with two antennas.

The receiver shown in FIG. 3A comprises first antenna 301 for receiving a reception signal, second antenna 302, and reception demodulator 303 for demodulating the reception signal. This embodiment utilizes the property of pulse signals, i.e. a short pulse signal propagates in a wide band, and a long pulse propagates only in a narrow band. Second antenna 302 receives only signals of a narrow frequency band, so that it receives only long pulse signals out of the reception signals. First antenna 301 receives signals of a wide frequency band, so that it receives both of long pulse signals and short pulse signals.

Figure 3B:
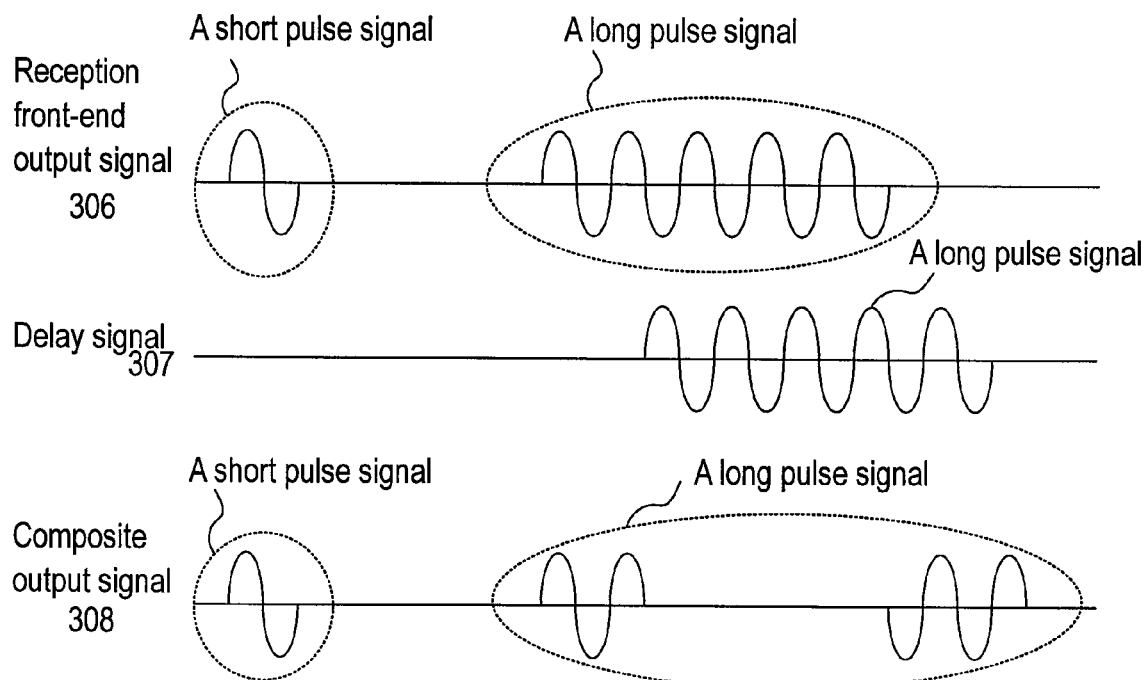
FIG. 3B shows composition of pulse signals in the receiver in accordance with the second embodiment of the present invention.

FIG. 3B shows the combining of pulse signals in the receiver in accordance with the second embodiment of the present invention. In this embodiment, reception front-end output signal 306 is combined with delay signal 307 by delay pulse composition circuit 102, as it is done in the first embodiment. Composite output signal 308 supplied from circuit 102 generates one pulse with respect to a short pulse signal while long pulse signals cancel each other out in part, so that the integral electric power can be greatly reduced. Reception demodulator 303 thus can demodulate the short pulse signals with the input signal not being saturated. The receiver of the present invention allows the long pulse signals, which work as interference signals, to cancel out each other, and can demodulate only short pulse signals of desirable signals in a stable manner. This receiver has a simple structure and is suitable for mass production.

The second embodiment refers to the reception signal formed of two types of pulse signals, i.e. a short pulse signal and a long pulse signal; however, the reception signal formed of more than two types of pulse signals also produces a similar advantage to what is discussed above.

Figure 4A:
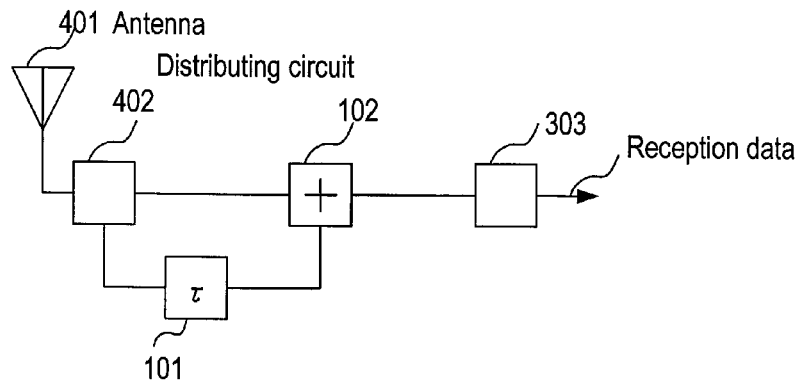
FIG. 4A shows a block diagram illustrating a receiver in accordance with the second embodiment of the present invention.

The foregoing embodiment employs plural antennas; however, as shown in FIG. 4A, use of antenna 401 having a wide range of frequency band together with distributing circuit 402 having uniform distributing characteristics in a narrow range frequency band allows the antenna to be one unit. FIG. 4A shows a block diagram illustrating a receiver in accordance with the second embodiment of the present invention. Antenna 401 can receive pulse signals over a wide range frequency band, so that it receives reception signals formed of long pulse signals and short pulse signals. Distributing circuit 402 distributes pulse signals of only a given frequency band. As the distributable range of frequency band becomes smaller, the length of distributable pulse signal becomes greater, so that only the long pulse signals are distributed to delay circuit 101.

The long pulse signals supplied from distributing circuit 402 and fed into delay circuit 10 are delayed by delay time τ. Delay pulse composition circuit 102 combines the long pulse signals delayed by delay circuit 101 with the signal received by antenna 401 and passed through distributing circuit 402, as other embodiments do. In this case, in delay pulse composition circuit 102, the short pulse signals out of the reception signals received by antenna 101 are not canceled each other out; however, the long pulse signals are canceled each other out in part, so that the integral power consumption can be reduced substantially.

Figure 4B:
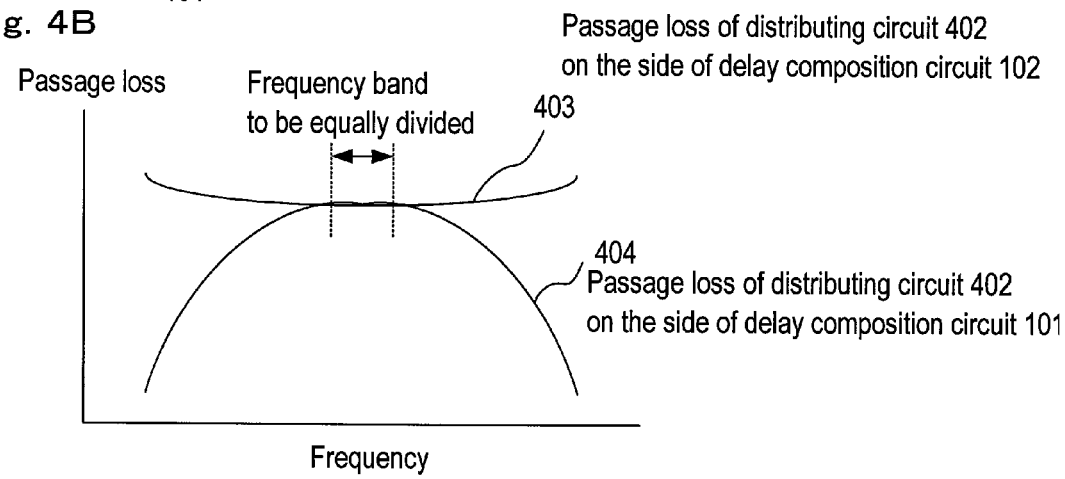
FIG. 4B shows frequency characteristics of a distributing circuit of the receiver in accordance with the second embodiment of the present invention.

FIG. 4B shows frequency characteristics of distributing circuit 402 of the receiver in accordance with the second embodiment of the present invention. FIG. 4B shows a smaller passage loss at a greater value on the vertical axis, and a given frequency band is equally distributed by distributing circuit 402.

In FIG. 4B, passage loss 403 of the output from distributing circuit 402 to delay pulse composition circuit 102 keeps almost stable, while passage loss 404 of the output to delay circuit 101 changes in response to the frequency band of the pulse signals. In the case of the given frequency band, both of the passage losses become the same, so that the pulse signal of which length corresponds to the given frequency band is equally distributed and fed into also delay circuit 101. In the case of other frequency bands than the given one, both of the passage losses differ from each other, so that the pulse signal is not equally distributed or not fed into delay circuit 101.

Figure 4C:
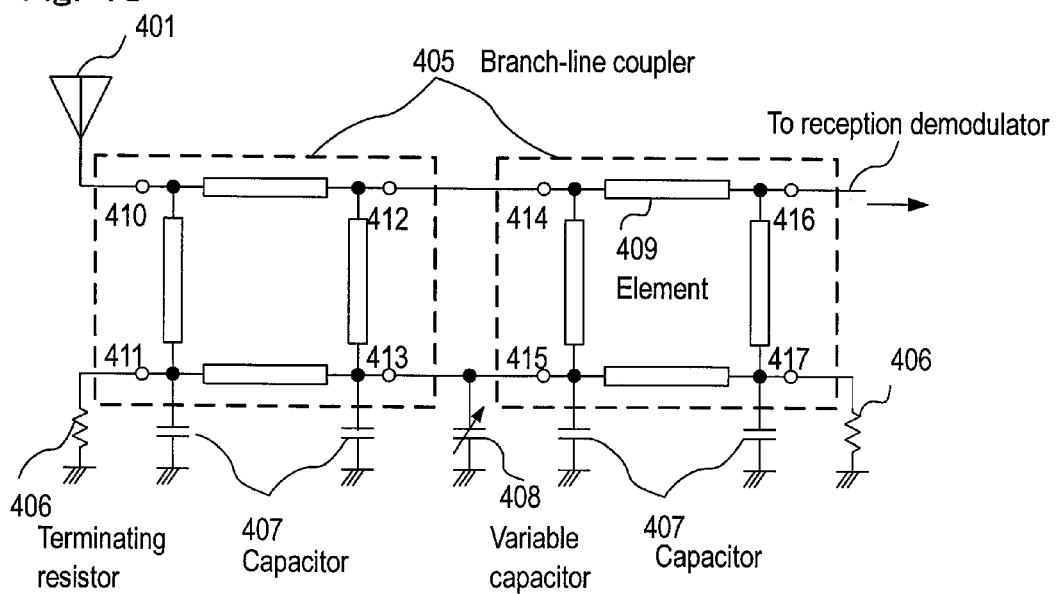
FIG. 4C shows branch-line couplers forming the receiver in accordance with the second embodiment of the present invention.

FIG. 4C shows a placement of branch-line couplers 405 employed as distributing circuit 402 and delay circuit 101 of the receiver in accordance with the second embodiment of the present invention. In FIG. 4C, branch-line coupler 405 comprises terminating resistor 406, capacitor 407, variable capacitor 408, elements 409 forming coupler 405, and terminals 410-417. Coupler 405 is formed of four lines coupled together ring-wise, and each one of the four lines has ¼ wavelength of the center frequency of the given frequency band, i.e. phase amount of 90 degrees, which matches the circuit perfectly, and yet, the circuit is completely isolated.

In other words, when the pulse signal received by antenna 401 has a given center frequency, branch-line coupler 405 works as distributing circuit 402. The pulse signal from antenna 401 is supplied to terminal 412 with a delay of 90 degrees, and to terminal 413 with a delay of 90×2 degrees. Since the output from terminal 413 delays from the output supplied from terminal 412 by 90 degrees, branch-line coupler 405 works also as delay circuit 101. Terminal 412 is isolated from terminal 413, so that no pulse signal is transmitted between these two terminals.

On top of that, branch-line coupler 405 also has the characteristics of the delay pulse composition circuit according to the distributing characteristics law of branch-line coupler 405. Terminal 414 is isolated from terminal 415, so that pulse signals are not transmitted between these terminals.

Since the present invention relates to wireless devices used in UWB communication systems, it is necessary, in a high frequency region, to consider the characteristics of distributed constant circuit. In this case, terminating reistor 406 is provided for impedance matching, and capacitor 407 as well as variable capacitor 408 can delay the phase of pulse signals by 90 degrees through the line shorter than ¼ wavelength of the center frequency in order to advance the phase of the pulse signals. The foregoing description tells that capacitor 407 works for downsizing coupler 405 as well as narrowing the band of branch-line coupler 405, and variable capacitor 408 works as the delay circuit.

The coupler of the present invention is not limited to the branch-line coupler, but a rat-race type coupler or a coupler with parallel coupled line has also frequency characteristics, and these two types of couplers can produce a similar advantage to that of the branch-line coupler. The present invention is not limited to two distribution, but use of three or more than three distributions produces a similar advantage.

Figure 5:
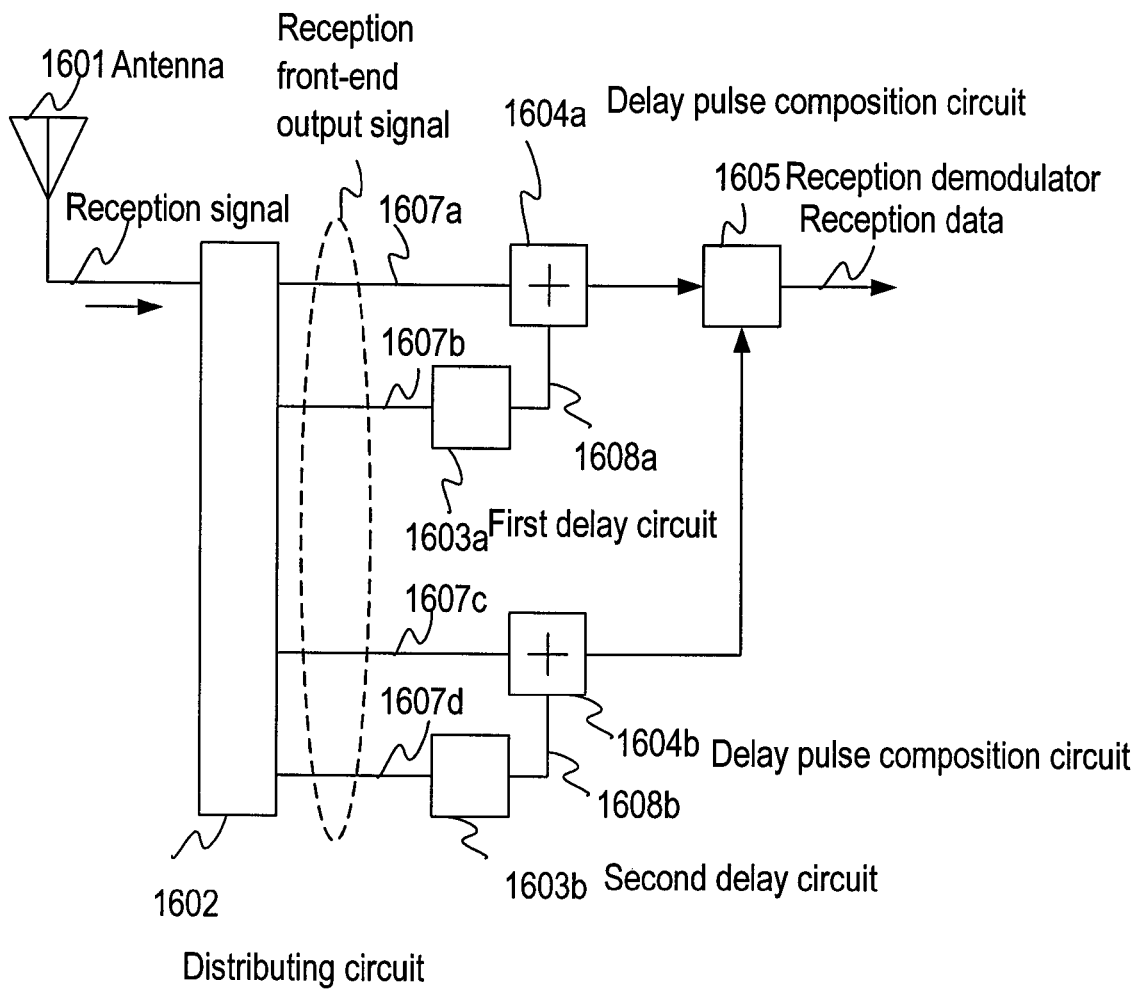
FIG. 5 shows a block diagram illustrating a receiver in accordance with the second embodiment of the present invention.

FIG. 5 shows a block diagram illustrating the structure of a receiver in accordance with this second embodiment. The structure tells that a reception signal includes three types of pulse signals, the distributing circuit distributes signals in four ways, and two delay circuits are available. The receiver shown in FIG. 5 includes distributing circuit 1602, first delay circuit 1603*a*, second delay circuit 1603*b*, delay pulse composition circuits 1604*a*, 1604*b*, and reception demodulating circuit 1605. Distributing circuit 1602 receives a reception signal supplied from antenna 1601, and outputs reception front-end output signals 1607*a*-1607*d*, which are free from being delayed but fed into delay pulse composition circuits 1604*a*, 1604*b*. Reception front-end output signals 1607*b* and 1607*d* are delayed differently from each other by first delay circuit 1603*a* and second delay circuit 1603*b* respectively, then they are supplied to delay pulse composition circuits 1604*a* and 1604*b* as delay signals 1608*a* and 1608*b*. Circuits 1604*a* and 1604*b* output signals to demodulator 1605 where the signals are demodulated to reception data.

Figure 6:
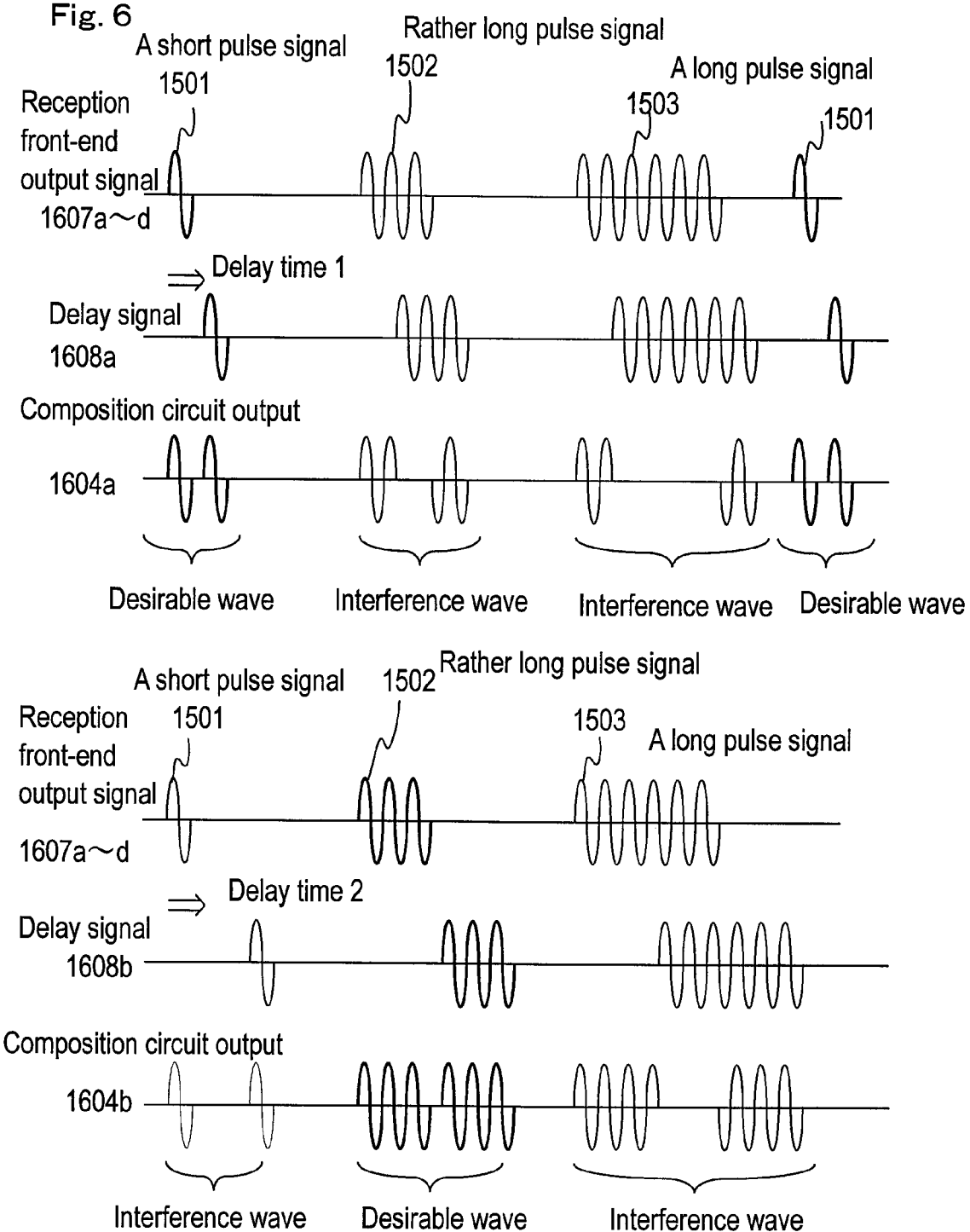
FIG. 6 shows status of delaying and combining reception signals in the receiver in accordance with the second embodiment of the present invention.

The delay and combining operations of the reception signals in the receiver of the present invention are demonstrated hereinafter with reference to FIG. 6. Reception front end output signals 1607*a*-1670*d* include pulses having different pulse widths such as short pulse signal 1501, rather long pulse signal 1502, and long pulse signal 1503. The following description shows examples of taking out pulse signal 1501 or 1502 as a desirable signal. In the case of taking out short pulse signal 1501 as a desirable signal, first delay circuit 1603*a* adds delay time "1" to reception front-end output signal 1607*b*, and outputs delay signal 1608*a*. Delay pulse composition circuit 1604*a* combines signal 1608*a* and reception front-end output signal 1607*a*, thereby reducing the electric power of rather long pulse signal 1502, which works as interference wave, as well as the power of long pulse signal 1503, to as low as that of the desirable wave. Reception demodulator 1605 can demodulate the desirable wave, i.e. short pulse signal 1501.

In a similar way, in the case of taking out rather long pulse signal 1502 as desirable wave, second delay circuit 1603*b* adds delay time "2" to reception front-end output signal 1607*d*, and outputs delay signal 1608*b*. Delay pulse composition circuit 1604*b* combines signal 1608*b* and reception front-end output signal 1607*c*, thereby reducing the power of short pulse signal 1501, which works as interference wave, as well as the power of long pulse signal 1503, to as low as that of the desirable wave. Reception demodulator 1605 can demodulate the desirable wave, i.e. rather long pulse signal 1502. Long pulse signal 1503 can be also taken out as the desirable wave in a similar way.

Figure 7:
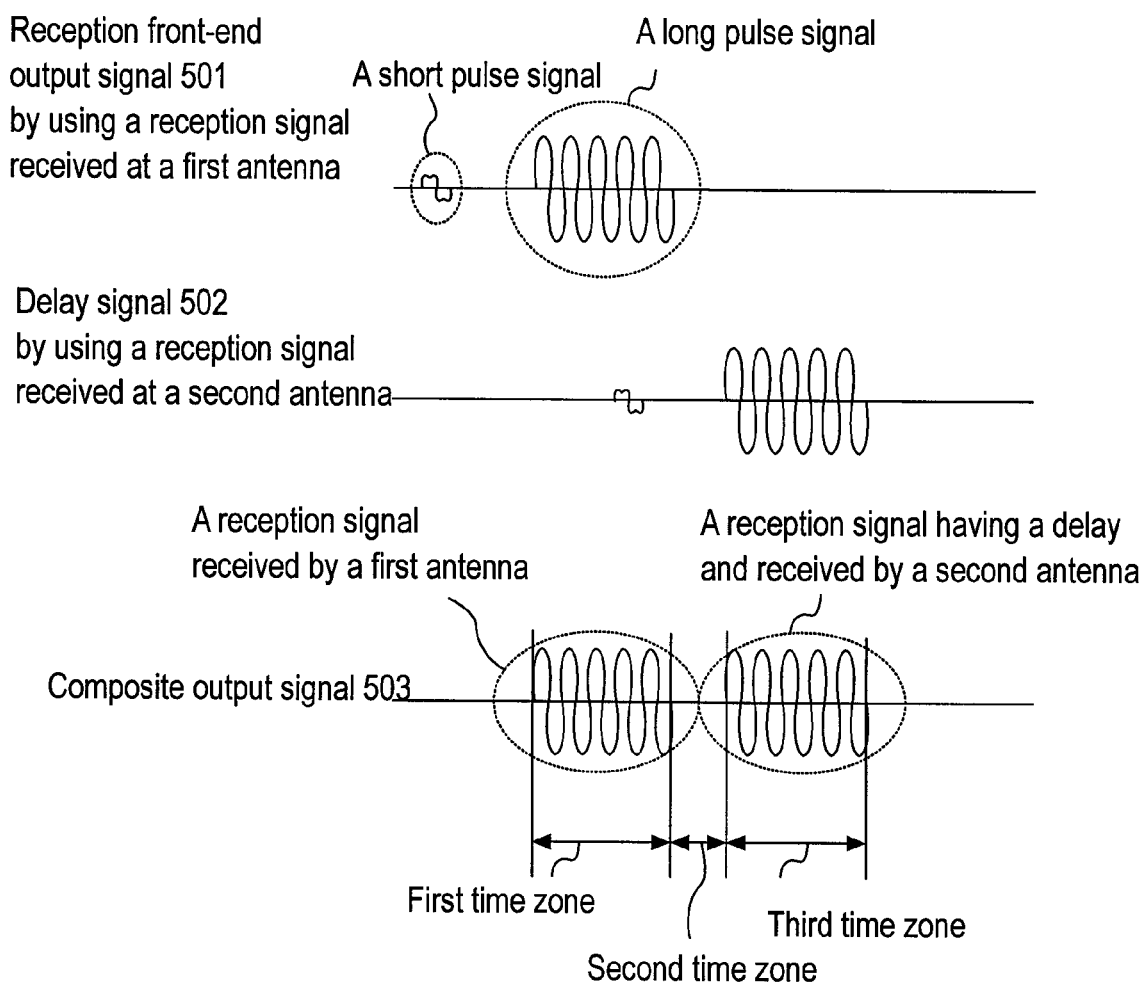
FIG. 7 shows combining of pulse signals in the receiver in accordance with the second embodiment of the present invention.

Although the first and second embodiments demonstrate the case where the short pulse signal is a desirable wave; however, the long pulse signal can be the desirable wave, and the operation such as redundancy in the demodulating process increases can be done. FIG. 7 shows the combining of the pulse signals with each other in the receiver in accordance with the second embodiment of the present invention. FIG. 7 shows the following three signals: reception front-end output signal 501 processed from the reception signal received by a first antenna, delay signal 502 processed from the reception signal received by a second antenna, and composite output signal 503. As signal 503 in FIG. 7 shows, the demodulating process of this second embodiment can demodulate twice the same signal, i.e. the long pulse signal, namely, in a first time zone and in a third time zone. A second time zone, i.e. a delay time, can be arbitrarily controlled, for instance, sync process is carried out in the first time zone, and demodulating process is carried out in the third time zone.

Embodiment 3

Figure 8:
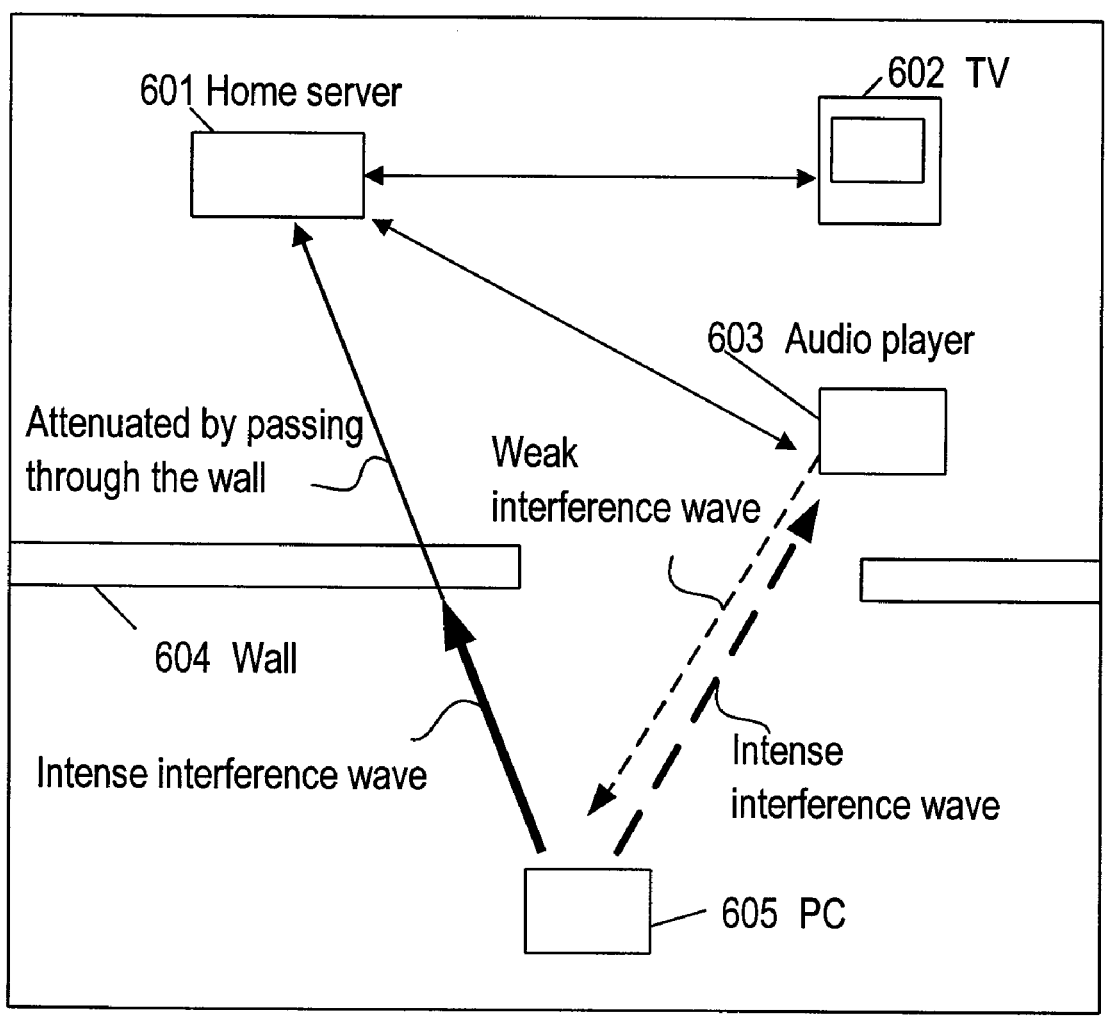
FIG. 8 shows a structure of a wireless system in accordance with a third embodiment of the present invention.

FIG. 8 shows a structure of a wireless system in accordance with the third embodiment of the present invention. The wireless devices shown in FIG. 8 includes home server 601, television receiver (TV) 602, and audio player 603. These three devices are placed, e.g. in one room at a distance of several meters in between. In such a situation, the communication between them employs short pulse signals, and the signals are spread over a wide range frequency band, so that a frequency component per unit frequency becomes extremely small. This structure allows these wireless devices to communicate with each other without adversely affecting other communication systems working in a narrow band. In this case, the communication between the transmitter and the receiver of the present invention, i.e. between the wireless devices, for instance, the communication between home server 601 and TV 602 as well as the communication between home server 601 and audio player 603 employs time-division or frequency-division to isolate these two communications from each other to avoid interference.

Figure 9A:
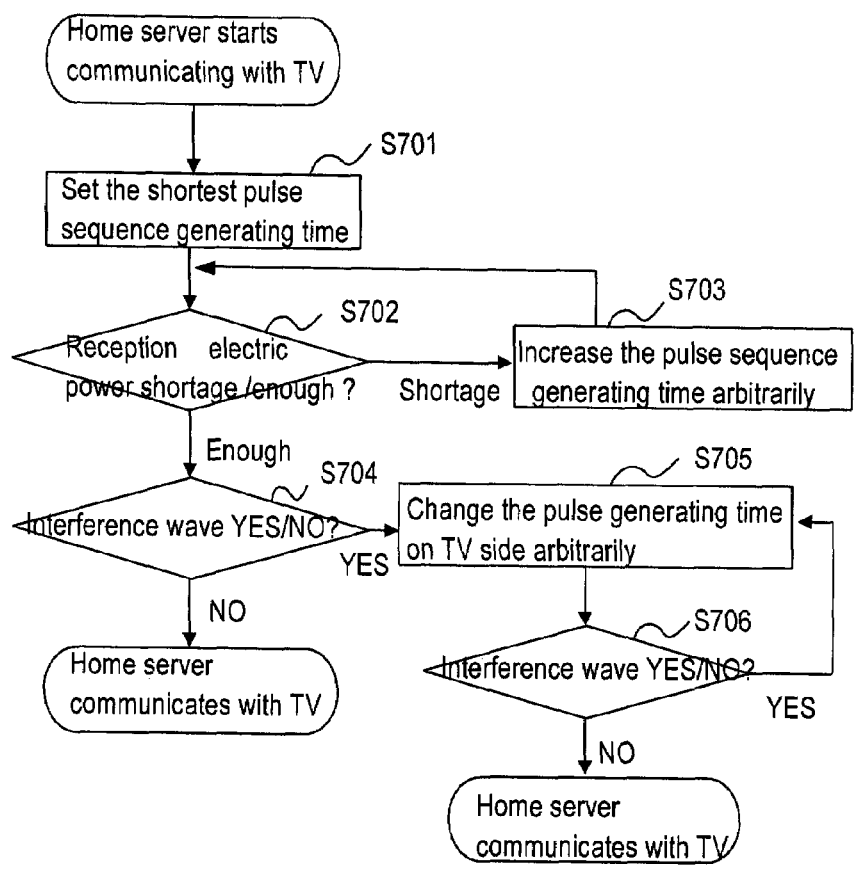
FIG. 9A shows a flowchart illustrating operation of the wireless system in accordance with the third embodiment of the present invention.

FIG. 9A shows a flowchart illustrating operation at starting the communication of the wireless system in accordance with the third embodiment of the present invention. Assume that home server 601 now communicating with audio player 603 is going to start communicating with TV 602. Before starting the communication with TV 602, home server 601 sets a pulse sequence generating time, e.g. at a minimum length (S701), and prepares authentication and adjusts an electric power for the communication. At this stage, home server 601 determines the communicating condition such as TV 602 provides no reply to the request of starting the communication or a reply signal has a low S/N ratio. A determination of power shortage (S702: shortage) prompts the pulse sequence generating time to increase up to an appropriate level (S703).

Then home server 601 determines whether or not interference wave exists (S704), and a determination of no interference wave allows starting the communication between home server 601 and TV 602. When interference wave exists (S704: YES), a pulse generating time on TV 602 side, i.e. the latter starter of the communication, is changed appropriately (S705) so that the signals from TV 602 cannot overlap the signals from audio player 603 (S706).

Figure 9B:
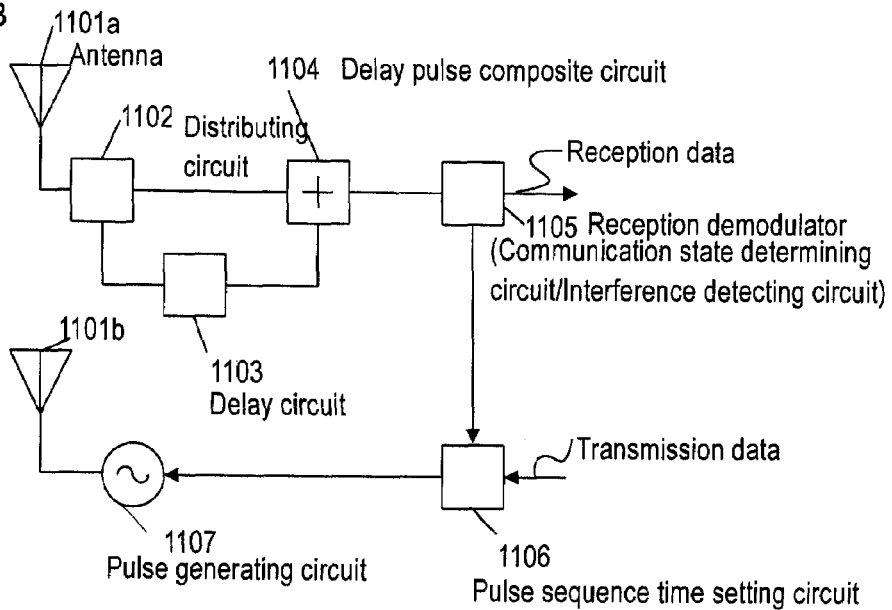
FIG. 9B shows a block diagram illustrating a structure of a wireless device formed of a receiver and a transmitter in accordance with the third embodiment of the present invention.

FIG. 9B shows a block diagram illustrating a structure of a wireless device formed of a receiver and a transmitter in accordance with the third embodiment of the present invention. The wireless device of the present invention receives signals at antenna 1101*a*, and the signals undergo a delay-composition process in distributing circuit 1102, delay circuit 1103, and delay pulse composition circuit 1104. Reception demodulator 1105 demodulates the signals supplied from circuit 1104. Reception demodulator 1105 can work as a communication state determining circuit for determining the communication status as well as an interference detecting circuit for detecting whether or not interference wave exists, namely, demodulator 1105 detects coexistence status. Based on the information of the detection, pulse-sequence-time setting circuit 1106 sets a pulse-sequence-time. Pulse generating circuit 1107 generates pulses based on an output from circuit 1106, and transmits the pulses from antenna 1101*b*.

Figure 10:
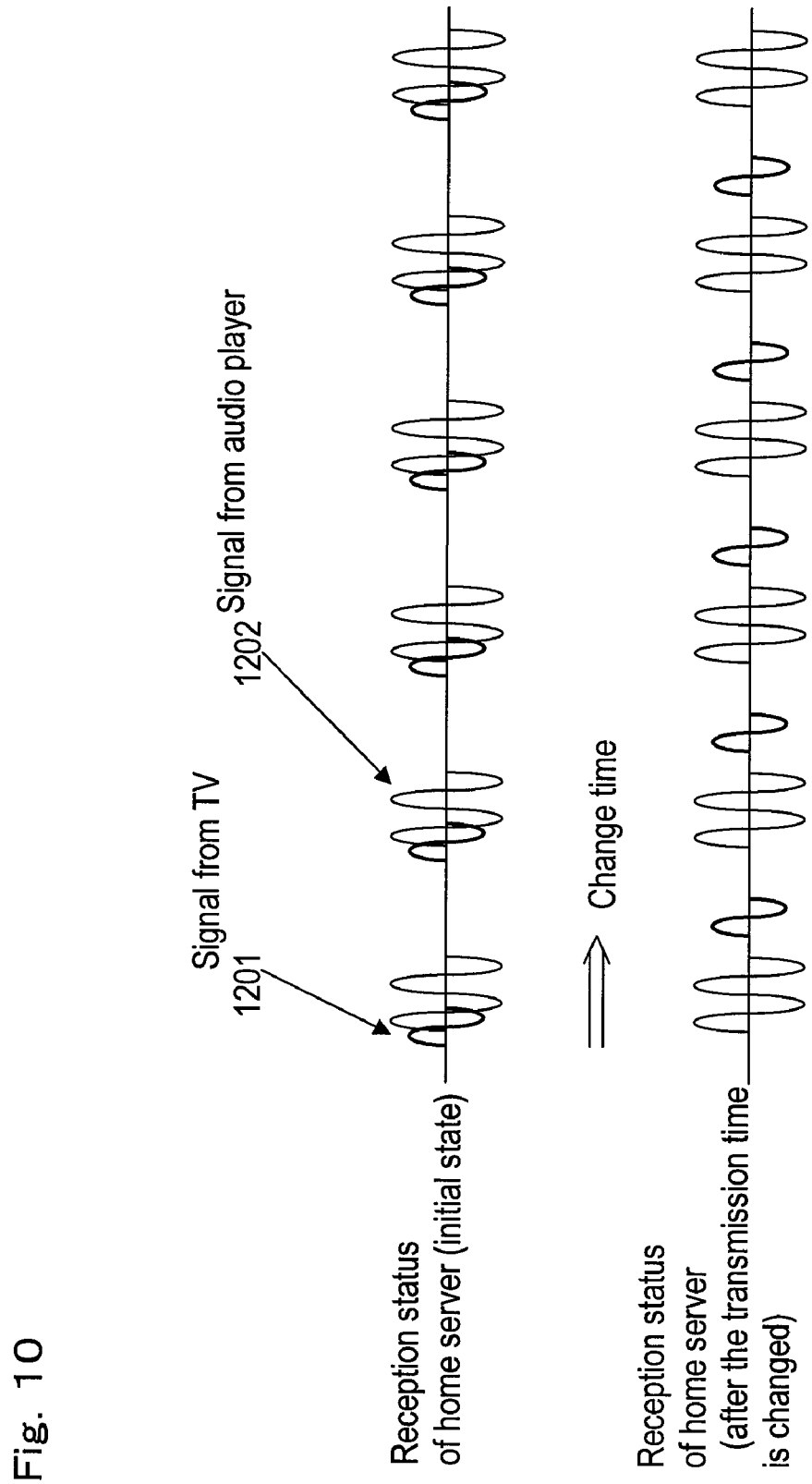
FIG. 10 shows a status of signals of the wireless device in accordance with the third embodiment of the present invention.

FIG. 10 shows the status of signals of the wireless device in accordance with the third embodiment of the present invention. FIG. 10 shows that in the initial state, signal 1201 from TV 602 overlaps with signal 1202 supplied from audio player 603 in the reception signal of home server 601. This overlap can be separated by using, e.g. the difference between the respective code strings; however, this separation lowers the communication speed due to redundant information. To overcome this problem, the transmission time of signal 1201 from TV 602 is changed in order to avoid overlapping of the signals, so that signal 1201 from TV 602 can be separated from signal 1202 from audio player 603 just by differentiating the timings of taking-in the signals for demodulating. As a result, redundant information can be reduced and yet the communication speed can be increased.

The foregoing description refers to the instance where the pulse sequence generating time at starting the communication is minimized; however, use of the time for the last communication as a reference, and the pulse generating time is adjusted based on this reference so that the shorter but adequate time can be set. The foregoing instance shows that only the pulse generating time is adjusted; however, in addition to the adjustment of the pulse generating time, the electric power involved in the communication can be adjusted to an appropriate value by increasing or decreasing the signal amplitude.

Next, for instance, one of the wireless devices of the present invention, namely, PC (personal computer) 605 placed in the next room starts operation and communicates with home server 601 with radio signals. In this case, the communicating distance between home server 601 and PC 605 is distant and wall 604 strides across the communication route, so that the signals having greater power are needed. The greater electric power for transmission is thus necessary for this communication.

Figure 11:
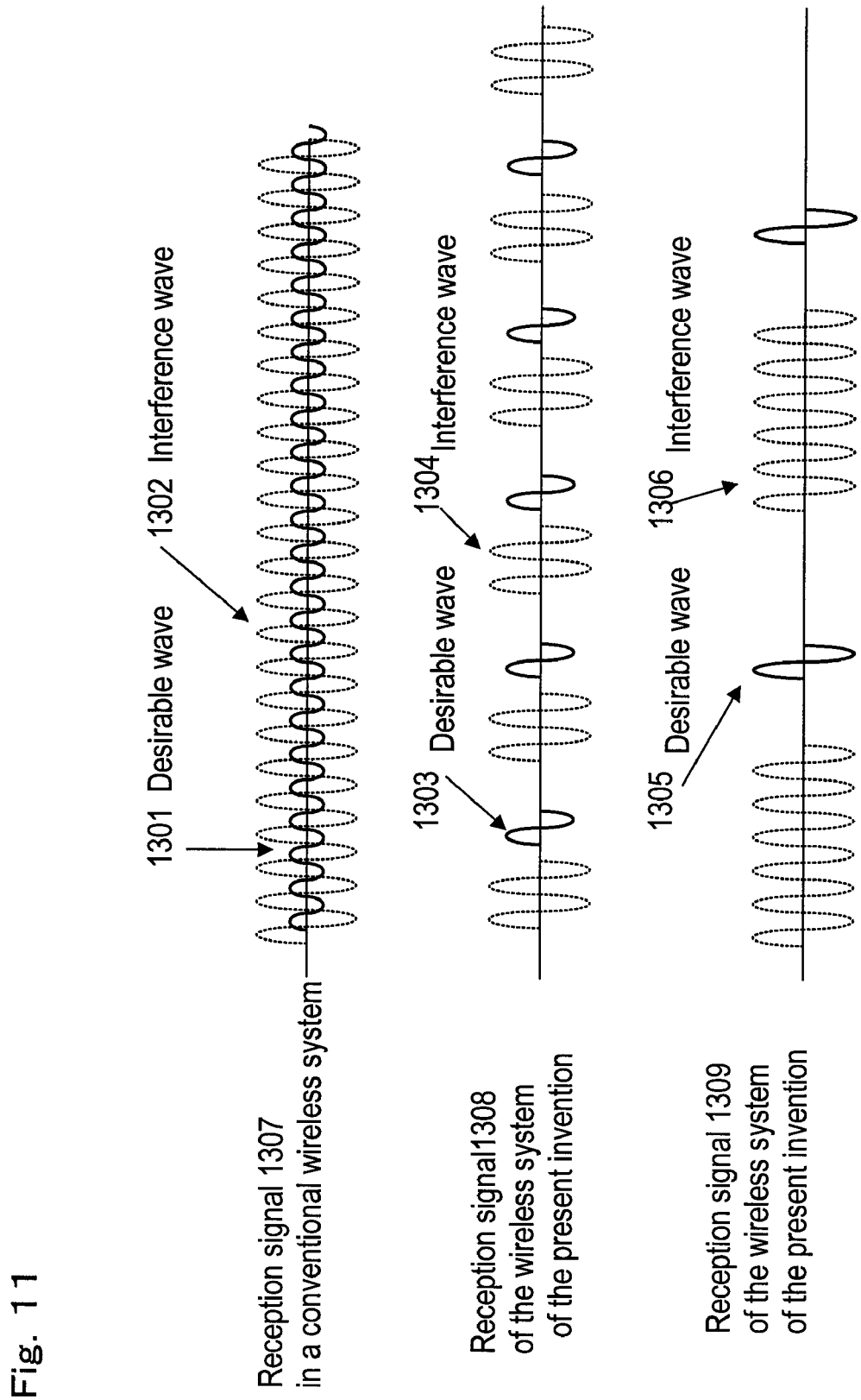
FIG. 11 shows reception signals of an audio player, which is an example of the wireless device in accordance with the third embodiment of the present invention.

FIG. 11 shows reception signals of audio player 603, which is an example of the wireless device in accordance with the third embodiment of the present invention. FIG. 11 also shows reception signal 1307 of a conventional wireless system, and as signal 1307 tells, in the conventional wireless system which uses continuous waves, PC 605 radiates signals of greater power to audio player 603 placed near to PC 605 rather than to home server 601 which is in fact the communication target but placed distantly from PC 605. Audio player 603 thus receives interference wave 1302 of greater amplitude than that of its desirable wave 1301, so that signals supplied from an amplifier or a mixer of the receiving system are distorted by the interference wave. As a result, the communication between home server 601 and audio player 603 can be hampered.

Reception signal 1308 shown in FIG. 11 indicates that a small difference in the electric power between desirable wave 1303 and interference wave 1304 allows receiving and demodulating the reception signals by changing pulse positions as the previous embodiment describes. However, reception signal 1309 shown in FIG. 11 indicates that a great difference in the electric power between desirable wave 1305 and interference wave 1306, namely, a great difference in the number of sine-waves shown in FIG. 11, results in no desirable gain or no converted characteristics even if the pulses overlap each other time-wise. Because an excessive response to incoming interference wave 1306 causes to distort incoming desirable wave 1305 provided that the amplifier or the mixer of the receiving system is not so structured as working only when the desirable wave is supplied.

The wireless system in accordance with this third embodiment employs the receiver and the transmitter demonstrated in either one of the first or second embodiment, thereby using short pulse signals for the short distance communication between home server 601 and audio player 603. On the other hand, a long distance communication between home server 601 and PC 605 uses long pulse signals, so that audio player 603 can cancel out the long pulse signals supplied from PC 605. Audio player 603 thus can reduce the reception electric power to be used for the long distance communication, so that audio player 603 can communicate by using the radio wave for the short distance communication free from the interference by the radio wave to be used for the long distance communication.

Figure 12:
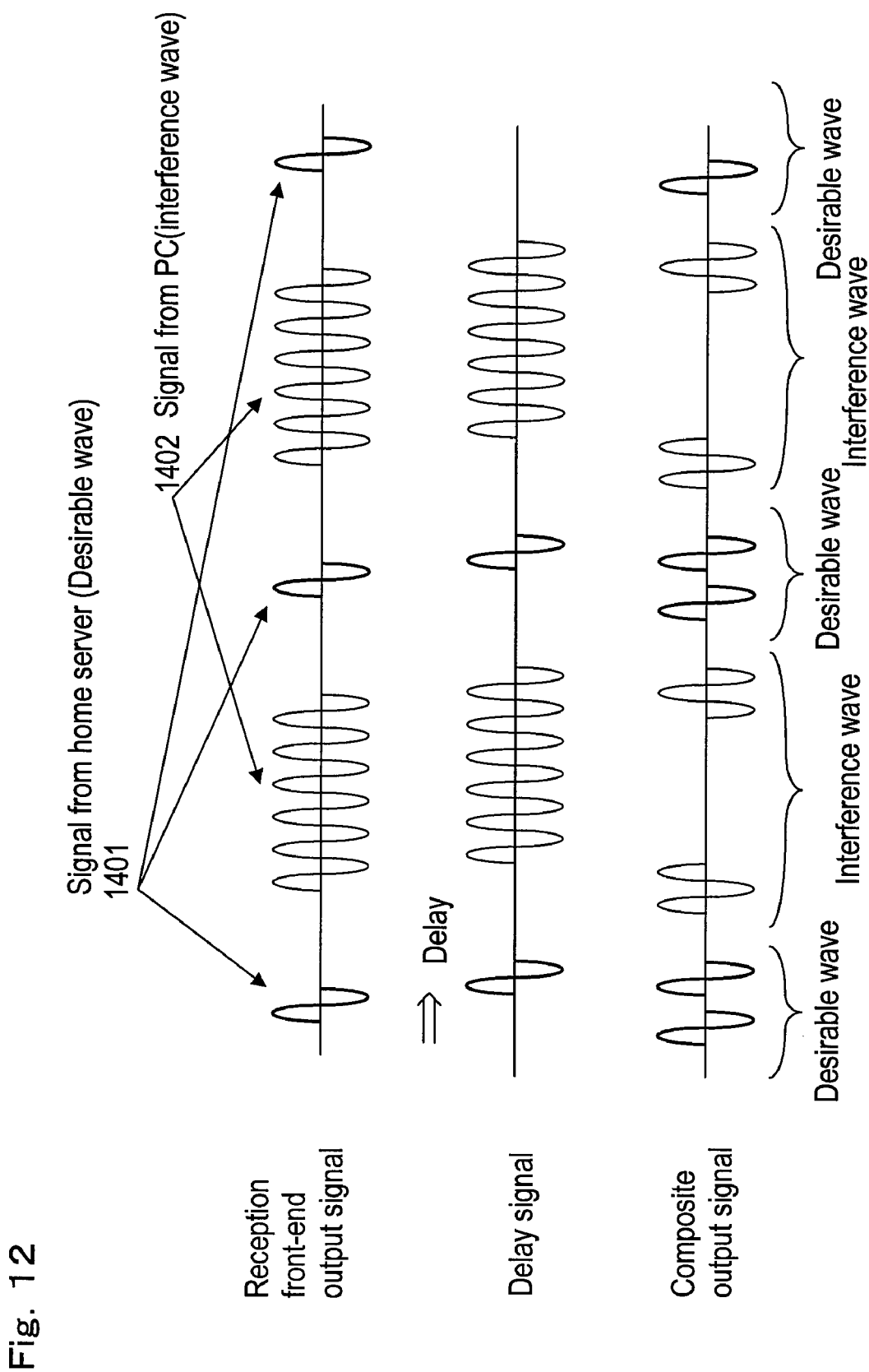
FIG. 12 shows reception signals of an audio player, which is an example of the wireless device in accordance with the third embodiment of the present invention.

FIG. 12 shows signals in audio player 603, an example of the wireless device in accordance with the third embodiment of the present invention. In FIG. 12, the reception signal of audio player 603 is formed of signal 1401 supplied from home server 601 as desirable wave, and signal 1402 supplied from PC 605 as interference wave. In this status, as discussed above, the interference wave is a signal having greater electric power, so that it is difficult to adjust the power of desirable wave 1401 to a certain level for demodulating. Therefore, a delay signal having a certain delay time is generated, and this delay signal is combined with the reception front-end output signal for generating a composite output signal. In this composite output signal, the electric power of the desirable wave becomes almost equal to that of the interference wave, so that a signal power ratio of desirable wave vs. interference wave can be substantially improved. For instance, in this instance, the ratio in the reception signal is 1:6 while the ratio in the composite output signal is improved to 2:3.

Use of the signals having a long pulse-sequence-generating time in a long distance communication indicates that signals in a narrow frequency band are used, so that the communication is carried out in the frequency band different from other narrow band communication systems. As a result, the frequency-division communication can be done advantageously with ease. When signals from other narrow-band communication systems become interference signals, which adversely affect the communication between the wireless devices in accordance with this embodiment, the pulse signals are elongated thereby concentrating the frequency components within the narrow frequency band for the wireless devices to be resistant to interference from other systems. In other words, the frequency band in use is narrowed for eliminating the frequency band which overlaps with that of another wireless device.

A transmission electric power is switched over by elongating pulse signals, so that communication of a greater channel-capacity can be carried out. This communication uses multi-level modulation which needs a greater C/N (carrier vs. noise) ratio. The oscillating circuits used in the first and second embodiments can be utilized as a frequency variable oscillating circuit, so that a frequency band to be used in a communication can be varied for forming a wireless system of frequency-division multiplexing. The frequency variable oscillating circuit is not particularly specified, but a known-circuit such as a voltage-controlled oscillator employing varactor diodes can be used.

On top of that, a combination of greatly different oscillating frequencies can be used such as a combination of short pulse signals used in the communication of 60 GHz band and long pulse signals used in the communication of 20 GHz. Higher-order oscillating frequency, transition of plural oscillating states, or switchover of plural oscillators can be used as a means for changing the oscillating frequency greatly.

The foregoing wireless system can be formed by using any wireless device described in the first and second embodiments, and the wireless system with this simple structure can switch or combine a distance, an area, and a speed of communication at an inexpensive cost.

Embodiment 4

Figure 13:
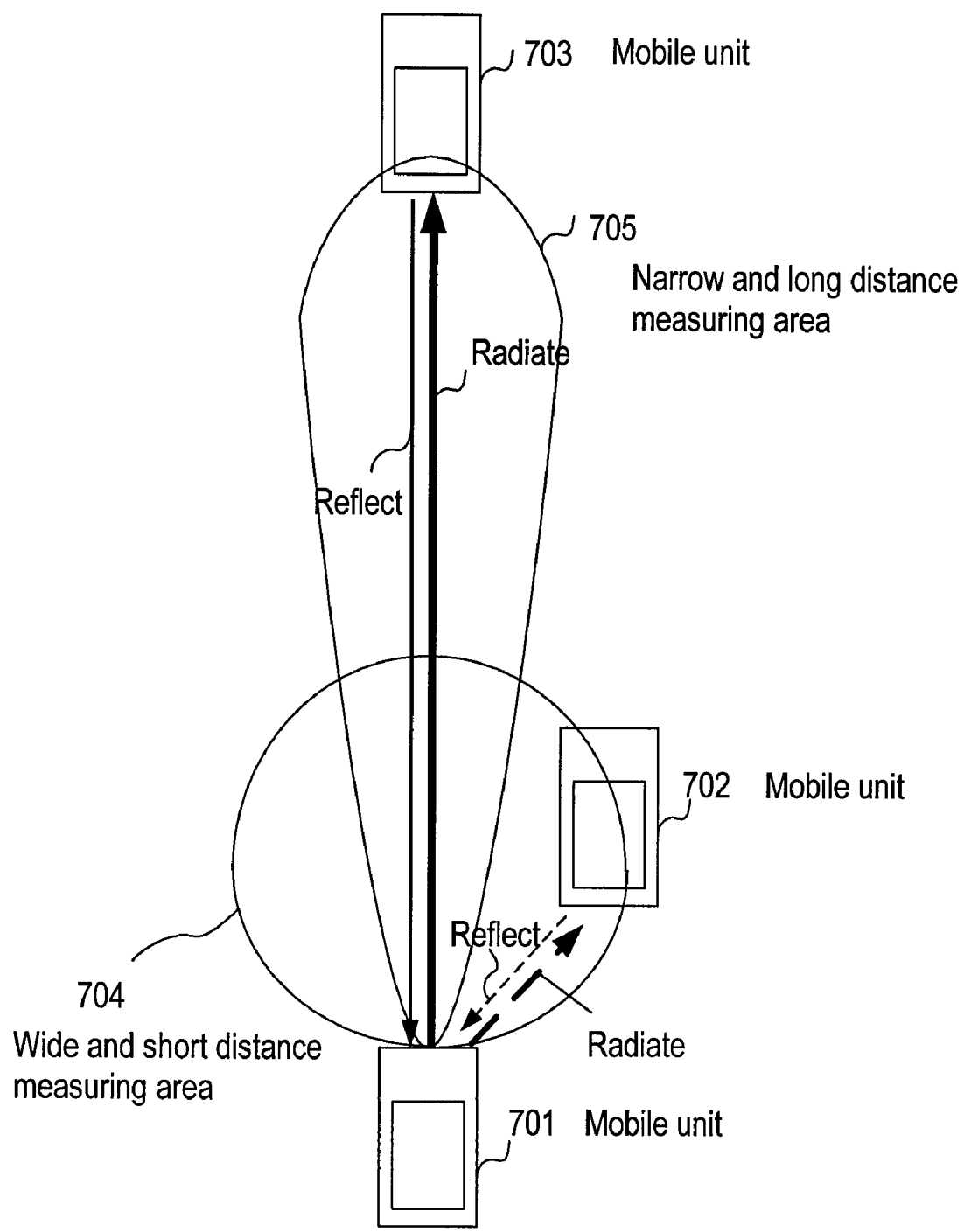
FIG. 13 shows a distance measuring system formed of wireless devices in accordance with a fourth embodiment of the present invention.
Figure 14:
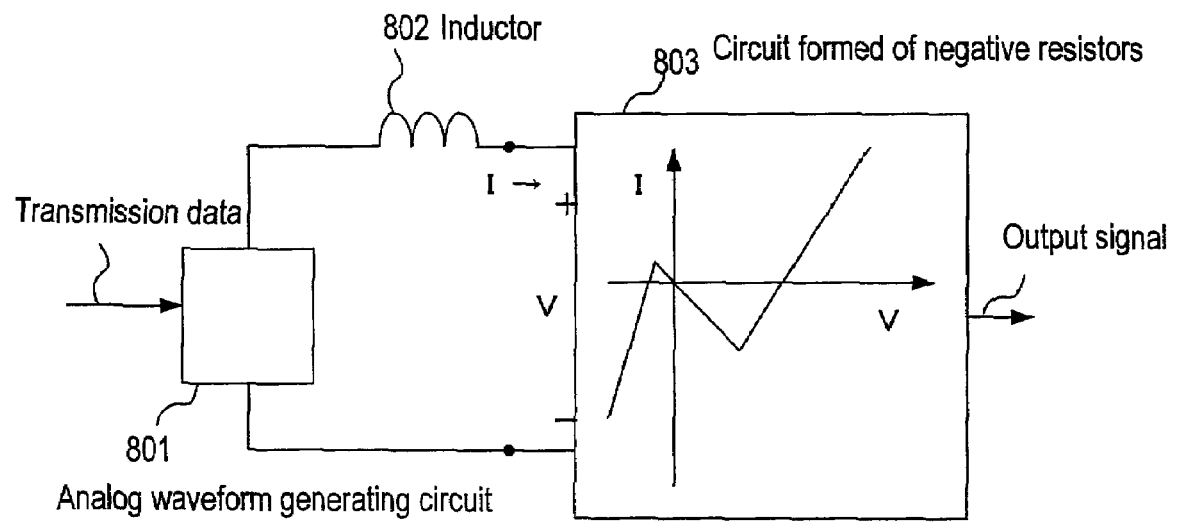
FIG. 14 shows a block diagram illustrating a structure of a pulse generating circuit of a conventional transmitter.
Figure 15:
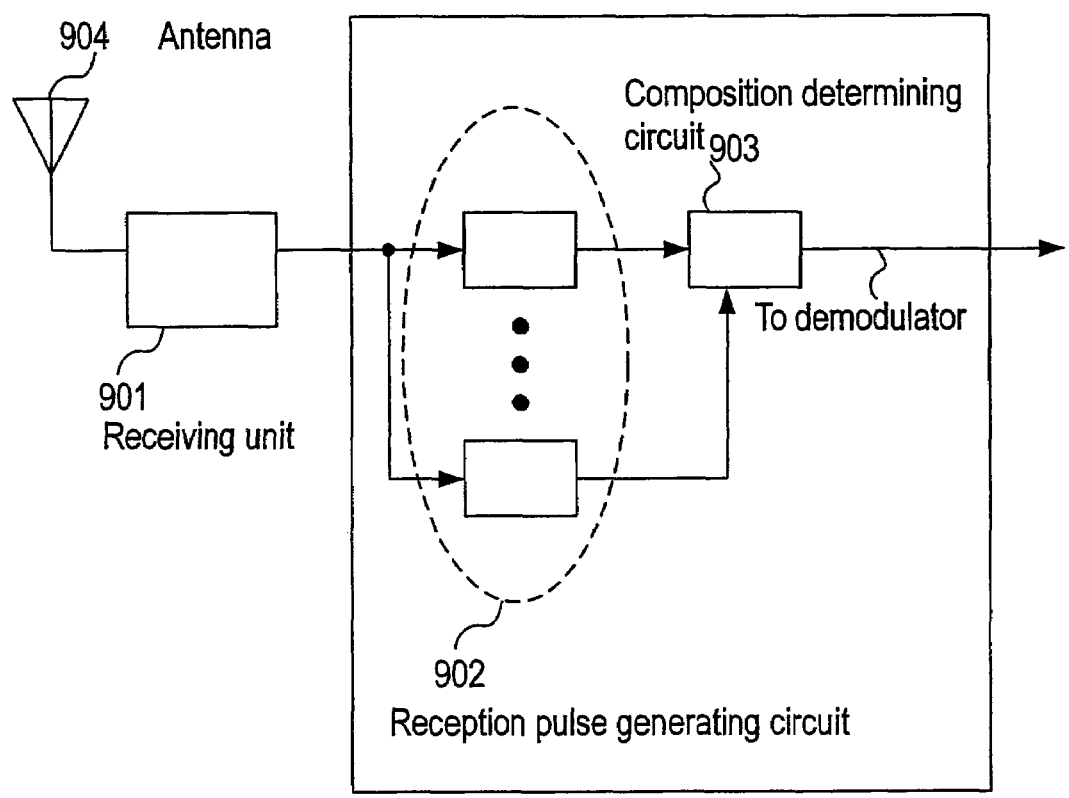
FIG. 15 shows a block diagram illustrating a structure of a conventional receiver.
Figure 16:
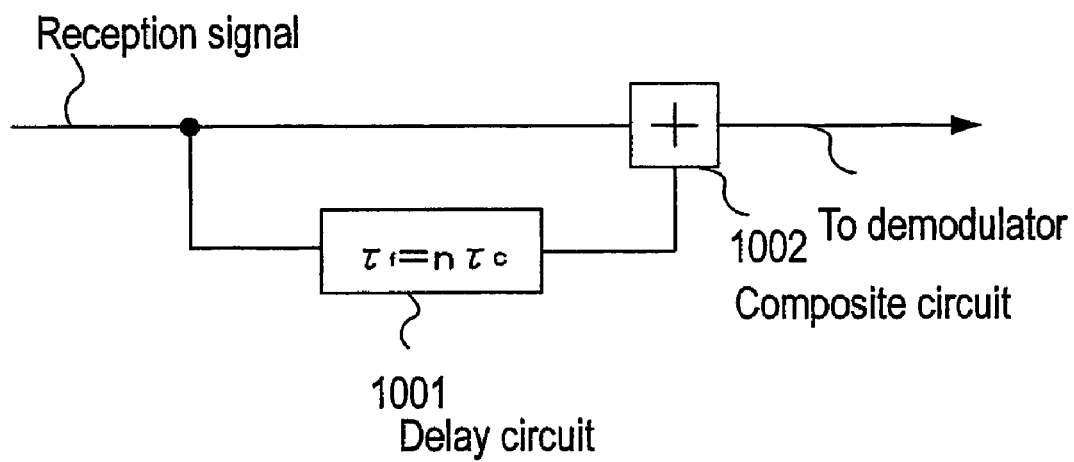
FIG. 16 shows a block diagram illustrating a signal demodulating circuit of the conventional receiver.

FIG. 13 shows a distance measuring system formed of the wireless devices including a receiver and a transmitter in accordance with the fourth embodiment of the present invention. In FIG. 13, mobile unit 701 carries a wireless device, and other mobile units 702, 703 are available near mobile unit 701. When mobile unit 701 moves, it is necessary to measure a distance between mobile unit 701 and mobile unit 702 or 703 in order to avoid the collision, or when the movement is to run after another mobile unit moving ahead, it is also necessary to measure the distance between unit 701 and the another unit.

Here is an example of measuring a distance: Short pulse signals transmitted from the wireless device of mobile unit 701 reflect on mobile unit 702, and mobile unit 701 receives the reflected signals again. The traveling time of the short pulse signals from the transmission, reflection, and reception again is measured, and the distance can be calculated by using this traveling time.

Here is another example; long pulse signals to be transmitted are provided with an appropriate frequency modulation, then calculate the following two beat frequencies: the beat frequency of the pulse signals transmitted from the wireless device of mobile unit 701, and another beat frequency of the pulse signals reflecting on mobile unit 703 and received again by mobile unit 701, namely, the beat frequency of reflected signals. These two beat frequencies can tell the distance to mobile unit 703.

In general, use of short pulse signals in the distance measuring is referred to as a pulse distance-measuring method, and use of long pulse signals in the distance measuring is referred to as an FM-CW distance-measuring method. Use of the wireless devices in accordance with the first and second embodiments allows obtaining a distance measuring system in which the pulse distance-measuring method is switched over to the FM-CW distance-measuring method or vice versa, or these two methods are combined together by arbitrarily changing the length of pulse signals.

An example of the switchover between the pulse distance-measuring method and the FM-CW distance-measuring method is shown in FIG. 13. The pulse distance-measuring method is used to measure the distance between mobile unit 701 and mobile unit 702 near to unit 701 by using wide and short measuring are 704. The pulse distance-measuring method features high accuracy of measuring and a wide angle of beam spread on horizontal plane. On the other hand, the FM-CW distance-measuring method is used to measure the distance between mobile unit 701 and mobile unit 703 placed distant from mobile unit 701 by using narrow and long measuring area 705. The FM-CW distance-measuring method features the following two points: the transmission electric power can be increased without affecting other systems, and a high directional antenna is achievable with ease.

The distance measuring system using ordinary pulses cannot radiate the next pulse before a reflected pulse is received because a transmission pulse must be separated from the pulse reflected on an object of measuring the distance. However, a short pulse signal does not interfere with a long pulse signal as described in the third embodiment about the communication system, so that long pulse signals can be continuously transmitted regardless of the reception of reflected pulses of short pulse signals from the object. As a result, the pulse distance-measuring method and the FM-CW distance-measuring method can be carried out sequentially.

In the case of measuring a distance of a mobile unit moving fast at a distance by an ordinary pulse distance measuring method, during the traveling of reflected pulses the mobile unit moves fast, so that the accuracy of the measuring is lowered. To overcome this problem, the number of pulses is varied in respective pulse signals to be transmitted, so that pulse signals can be transmitted sequentially without waiting reflected pulses, and yet, transmission signals and the reflected signals can be separated from each other. As a result, the distance can be measured within a short time cycle, and highly accurate measuring can be achieved with respect to a mobile unit moving fast.

In the case of measuring a distance of a mobile unit close to an extreme instance, it is difficult to measure the distance because the transmission signals and the reflected signals cannot be separated. However, according to the present invention, the number of pulses of respective pulse signals to be transmitted can be changed, so that a delay time between signals having different numbers of pulses is measured for calculating an equation of "delay time=traveling time+(time at receiving a signal having a second number of pulses−time at transmitting a signal having a first number of pulses). The distance can be calculated from this traveling time.

As discussed in the third embodiment, the oscillating circuit is utilized as a variable frequency oscillating circuit, so that the frequency band to be used for distance measuring can be changed, and a distance measuring system using the frequency-division multiplexing can be obtained. This system can avoid interference with other systems.

The wireless system of this fourth embodiment can be formed by using any wireless device described in the first and second embodiments, and the wireless system with this simple structure and at an inexpensive cost can switch over or combine distance-measuring devices having different measurable distances and areas.

INDUSTRIAL APPLICABILITY

A receiver of the present invention can cancel out pulse signals working as interference waves, and can demodulate only the pulse signals of desirable wave in a stable manner. The receiver is also suitable for mass production. The present invention also allows obtaining a transmitter and a wireless system at inexpensive costs and compact in sizes in response to the foregoing receiver. Those products are useful mainly for working with pulse signals in the range of microwave band-millimeter wave band.

The invention claimed is:

1. A receiver comprising:
a reception front-end for receiving a plurality of pulse signals including at least a first pulse signal and a second pulse signal as a reception signal, wherein a pulse sequence generating time of the second pulse signal is longer than a pulse sequence generating time of the first pulse signal;
a delay circuit for generating a delay signal by delaying a reception front-end output signal output from the reception front-end; and
a delay pulse composition circuit for combining the delay signal with the reception front-end output signal,
wherein a delay time given to the reception front-end output signal by the delay circuit is longer than the pulse sequence generating time of the first pulse signal, and is shorter than the pulse sequence generating time of the second pulse signal;
wherein the reception front end comprises a first antenna which receives both of the first pulse signal and the second pulse signal and a second antenna which receives only the second pulse signal;
wherein the second antenna is narrower in a reception frequency band than the first antenna;
wherein a reception signal received at the first antenna is output to the delay pulse composition circuit, and a reception signal received at the second antenna is output to the delay circuit; and
wherein the delay pulse composition circuit combines the delay signal output from the delay circuit with the reception front-end output signal output from the first antenna.

2. A transmitter comprising:
a control signal generating circuit for outputting a control signal which generates a plurality of pulse signals having pulse sequence generating times different from each other;
a pulse generating circuit for generating the plurality of pulse signals by using the control signal; and
a communication state determining circuit for determining a communication state, wherein the transmitter changes the pulse sequence generating time of the pulse signal based on information about communication state determined by the determining circuit.

3. The transmitter according to claim 2, wherein an oscillating circuit is used as the pulse generating circuit.

4. The transmitter according to claim 3, wherein the oscillating circuit is frequency variable.

5. The transmitter according to claim 3, wherein the oscillating circuit works intermittently by using the control signal.

6. The transmitter according to claim 2, wherein the transmitter generates at least two signals having different pulse sequence generating times as the plurality of pulse signals.

7. The transmitter according to claim 2, wherein the transmitter changes the pulse sequence generating time of the pulse signal to be shorter based on information about communication state determined good by the determining circuit.

8. The transmitter according to claim 2, wherein the transmitter changes the pulse sequence generating time of the pulse signal to be longer based on information about communication state determined poor by the determining circuit.

9. The transmitter according to claim 2, wherein a shorter pulse signal is used out of the pulse signals having different pulse sequence generating times from each other for communication between wireless devices of which communication state is good, and a longer pulse signal is used out of the pulse signals having different pulse sequence generating times from each other for communication between wireless devices of which communication state is poor.

10. The transmitter according to claim 2, further comprising an interference detecting circuit for detecting interference with other wireless devices, wherein the pulse sequence generating time of the pulse signal is changed based on interference information detected by the detecting circuit.

11. The transmitter according to claim 10, wherein the pulse sequence generating time of the pulse signal is changed to be longer based on information about existing interference detected by the detecting circuit.

12. The transmitter according to claim 10, wherein the pulse sequence generating time of the pulse signal is changed to be shorter based on information about no interference detected by the detecting circuit.

13. A wireless system comprising a transmitter and a receiver for receiving a signal supplied from the transmitter,
wherein the transmitter includes:
a control signal generating circuit for outputting a control signal which generates a plurality of pulse signals having pulse sequence generating times different from each other;
a pulse generating circuit for generating the plurality of pulse signals by using the control signal; and
a communication state determining circuit for determining a communication state, wherein the transmitter changes the pulse sequence generating time of the pulse signal based on information about communication state determined by the determining circuit; and
wherein the receiver includes:
a reception front end for receiving a plurality of pulse signals including at least a first pulse signal and a second pulse signal as a reception signal, wherein a pulse sequence generating time of the second pulse signal is longer than a pulse sequence generating time of the first pulse signal;
a delay circuit for generating a delay signal by delaying a reception front-end output signal output from the reception front end; and
a delay pulse composition circuit for combining the delay signal with the reception front-end output signal;
wherein a delay time given to the reception front-end output signal by the delay circuit is longer than the pulse sequence generating time of the first pulse signal and is shorter than the pulse sequence generating time of the first pulse signal.

* * * * *